United States Patent
Cotton et al.

(10) Patent No.: US 8,423,376 B2
(45) Date of Patent: Apr. 16, 2013

(54) APPARATUS AND METHOD FOR ONLINE NEGOTIATION

(75) Inventors: Mike Cotton, Manassas, VA (US); Todd Gagorik, Herndon, VA (US); Glen Gulyas, Arlington, VA (US); Mike Rowen, Oakton, VA (US); Chad Wach, Stone Ridge, VA (US)

(73) Assignee: Auto Bid Systems, Inc., Herndon, VA (US)

( * ) Notice: Subject to any disclaimer, the term of this patent is extended or adjusted under 35 U.S.C. 154(b) by 367 days.

(21) Appl. No.: 12/530,599

(22) PCT Filed: Mar. 10, 2008

(86) PCT No.: PCT/US2008/056410
§ 371 (c)(1),
(2), (4) Date: Jun. 7, 2010

(87) PCT Pub. No.: WO2008/112632
PCT Pub. Date: Sep. 18, 2008

(65) Prior Publication Data
US 2010/0241575 A1    Sep. 23, 2010

Related U.S. Application Data

(60) Provisional application No. 60/894,097, filed on Mar. 9, 2007.

(51) Int. Cl.
*G06Q 10/00* (2012.01)
*G06Q 30/00* (2012.01)
*G06Q 20/00* (2012.01)

(52) U.S. Cl.
USPC ............................. 705/1.1; 705/26.3; 705/80

(58) Field of Classification Search ............ 705/1.1, 705/80, 26.1, 26.3
See application file for complete search history.

(56) References Cited

U.S. PATENT DOCUMENTS

| | | | |
|---|---|---|---|
| 6,131,087 A * | 10/2000 | Luke et al. ................. | 705/80 |
| 7,797,220 B2 * | 9/2010 | McIntyre ................... | 705/37 |
| 2004/0128224 A1 | 7/2004 | Dabney et al. | |
| 2005/0010457 A1 * | 1/2005 | Ettinger ..................... | 705/7 |

OTHER PUBLICATIONS

Edieal Pinker et al., Managing Online Auctions: Current Business and Research Issues, Nov. 2003, Management Science, vol. 49, No. 11, pp. 1457-1484.*

* cited by examiner

*Primary Examiner* — Fonya Long
(74) *Attorney, Agent, or Firm* — Sughrue Mion, PLLC

(57) ABSTRACT

A system, apparatus, article of manufacture and method for facilitating an automatic negotiation between a consumer and a vendor for purchase of an item is described. An electronic negotiation unit receives an offer to purchase the item, and automatically processes the offer. The processing is performed by a computer and includes accepting the offer if it is greater than a bottom line price for the item. The offer is rejected if the offer is below a negotiation range which extends below the bottom line price. If the offer is within the negotiation range for the item, the electronic negotiation unit automatically generates a counter offer price that is greater than or equal to the bottom line price. If the counter offer is within a final offer range the counter offer is designated as a final counter offer.

10 Claims, 8 Drawing Sheets

APPARATUS AND METHOD FOR ONLINE NEGOTIATION

CROSS REFERENCE TO RELATED APPLICATIONS

This application is a National Stage of International Application No. PCT/US2008/056410 filed Mar. 10, 2008, claiming priority based on U.S. Provisional Application 60/894,097 filed Mar. 9, 2007, the contents of all of which are incorporated herein by reference in their entirety.

BACKGROUND

1. Field of the Invention

Systems, methods, and apparatus consistent with the present invention relate to automatically facilitating a negotiation between a buyer and seller of goods or services. More particularly, the systems, methods and devices described here concern a networked computer system that automatically makes an offer and/or counter offer that mimics a negotiation experience between a buyer and a seller.

2. Description of the Related Art

Many systems have been developed to date which allow a consumer to research specific products, to search actual and/or virtual inventory for a product provided by a specific vendor, and the ability to buy, bid on, or make an offer for a desired product. While these systems have given consumers a great deal of flexibility they do not allow a consumer to participate in the real-time negotiation of price with a vendor for a specific item. This negotiation process is especially important in the automotive space because it is what consumers have come to expect when dealing with automotive dealers in a face to face manner; however, consumers typically look at the face to face negotiation process as the least enjoyable part of the vehicle buying process. Despite advances in computer and networking technologies, there remains an unfulfilled need for a mechanism for facilitating a two-way offer/counter offer negotiation experience without the need for an in-person face to face meeting.

In a typical auction experience consumers make offers for specific item(s) and the success of those offers is based on offers from other consumers for the same item(s). But these conventional auction systems do not give a consumer a mechanism to negotiate individually and directly with the vendor of the item to allow for appropriate feedback, such as counter offers, from the vendor and the ability to negotiate in real-time. For example, the One Shot Bid process provides the consumer a one-way communication system where the amount the consumer is willing to pay, in this case a bid, is evaluated against a single value to determine success or failure but no additional feedback is provided. Such an approach often limits the consumer to a predetermined number of bids or offers.

Accordingly, there exists an unmet need for a system that automatically facilitates a two-way negotiation dialog between consumers and a system that negotiates on behalf of dealers. Such a system is needed to make counter offers on behalf of dealers based on pre-configured pricing components that the dealers establish. Further, a system is needed that is not limited to accepting only a predetermined number of bids or offers from a consumer.

SUMMARY

Embodiments of systems, apparatuses, articles of manufacture and methods are described here that facilitate an online negotiation between consumers and a system that operates automatically on behalf of a vendor of goods and/or services.

Illustrative, non-limiting embodiments of the present invention may overcome the disadvantages described above as well as other disadvantages. Embodiments of the present invention are not necessarily required to overcome any of the disadvantages described above, and the illustrative, non-limiting embodiments of the present invention may not overcome any of the problems described above. The appended claims should be consulted to ascertain the true scope of the invention.

Accordingly to an exemplary, non-limiting formulation of the present invention a method is provided for negotiating a sale of an item. The method includes receiving over a computer network an offer to purchase the item, and automatically processing the offer in response to receiving the offer, in which the processing is performed by a computer. The processing includes accepting the offer if the offer is greater than a bottom line price for the item, and rejecting the offer if the offer is below a negotiation range which extends below the bottom line price. If the offer is within the negotiation range for the item, a counter offer price is automatically generating that is greater than or equal to the bottom line price.

According to another exemplary, non-limiting formulation of the present invention, an apparatus facilitating a negotiation between a buyer and seller of an item includes an inventory management unit and a negotiation unit. The inventory management unit manages an inventory of items and information about the items including a bottom line price and a negotiation range for each item. The negotiation unit is coupled to the inventory management unit and a data communications network. The negotiation unit, in response to receiving an offer for an item managed by the inventory management unit, generates a counter offer if the offer is less than the bottom line price for the item and within the negotiation range for the item. It then transmits the counter offer to the buyer.

BRIEF DESCRIPTION OF THE DRAWINGS

The accompanying drawings, which are incorporated in and constitute a part of this specification exemplify certain embodiments of the present invention and, together with the description, serve to explain and illustrate principles of the inventive techniques. In these drawings, like reference numerals refer to like elements.

FIG. 10 is shows an example of a user interface for an online negotiation system after several offers and a counter offer have been made during an online negotiation.

DETAILED DESCRIPTION

A system, article of manufacture and method for facilitating online automated electronic negotiation are described here. The online negotiation system provides for an automated offer/counter offer solution meant to mimic the negotiation experience a consumer might encounter with a vendor of a product or service. An example of such a vendor is an automotive dealership with whom the consumer negotiates to purchase an automobile. The solution is meant to meet the needs of consumers and dealers in the vehicle space including new and used cars and recreational vehicles, trucks, motorcycles, watercraft and other power sport vehicles. However, the solution may be used for negotiation and sale of other items such as furniture or consumer goods, etc., and is not limited to vehicles. A dealer enables online negotiation for an item of inventory by setting certain negotiation variables such as a Buy Now Price, a Bottom Line Price, an Online Negotiation Range percentage, and a Final Offer Range percentage. Using these values the system allows a consumer to make offers to the dealer of the inventory and is capable of either rejecting the offer, producing a counter offer, or accepting the offer, all automatically without the direct human interaction of the dealer. At any time during the online negotiation process a consumer can immediately accept a current offer by the dealer which will be the lowest value comparing the Buy Now Price, any Counter Offer, and any Accepted offer. This is an immediate acceptance by the consumer to pay the lowest among these prices for the item of inventory in question.

Figure 1:
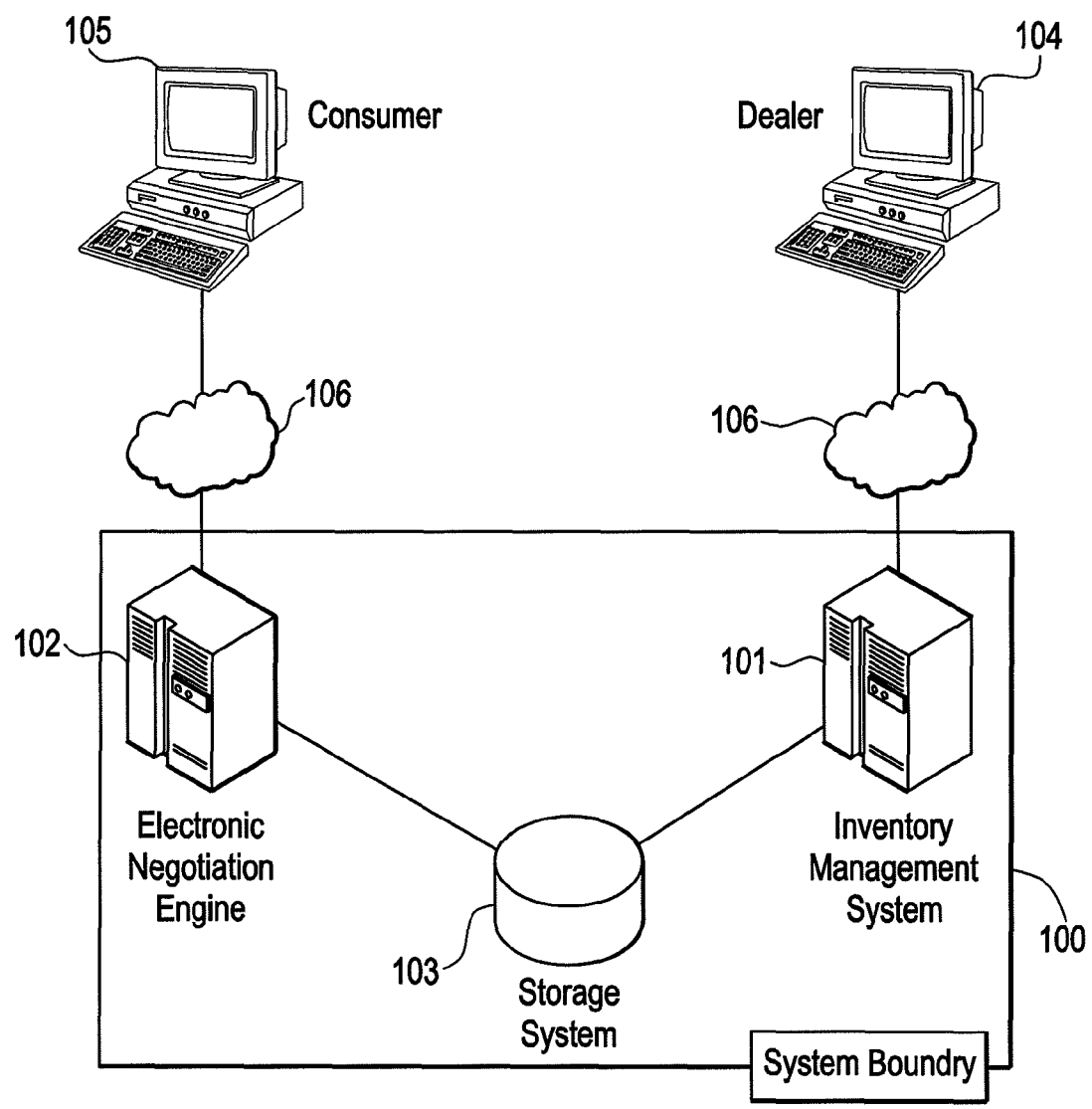
FIG. 1 is a diagram illustrating major system components in an exemplary embodiment of an electronic or on-line negotiation system.

An exemplary embodiment of an online negotiation system is illustrated in FIG. 1 which shows a view of the major components of an exemplary embodiment of an online negotiation system 100 and their relationship to one another. The online negotiation system 100 has an Inventory Management System 101 that includes components and modules that allow a dealer to set pricing information for the dealer's current inventory, an electronic negotiation engine 102 (shown in FIG. 1 as an eNEGOTIATION™ engine) that includes components and modules to allow a consumer to negotiate online for the dealer's priced inventory, and a Storage System 103 used to manage and store a record of pricing and online negotiation data.

While FIG. 1 depicts the major system components as separate physical hardware systems the components can be implemented using a single physical hardware system or scaled across any number of physical hardware systems. Connectivity into the system by dealers, through a dealer's computer 104, and consumers, through a consumer's computer 105, is handled using standard connected system protocols and existing communication channels such as those provided by a data network 106, such as the World Wide Web. However, this connectivity is not necessarily limited to Internet protocols as other computer networks and networking protocols can be used.

Figure 2:
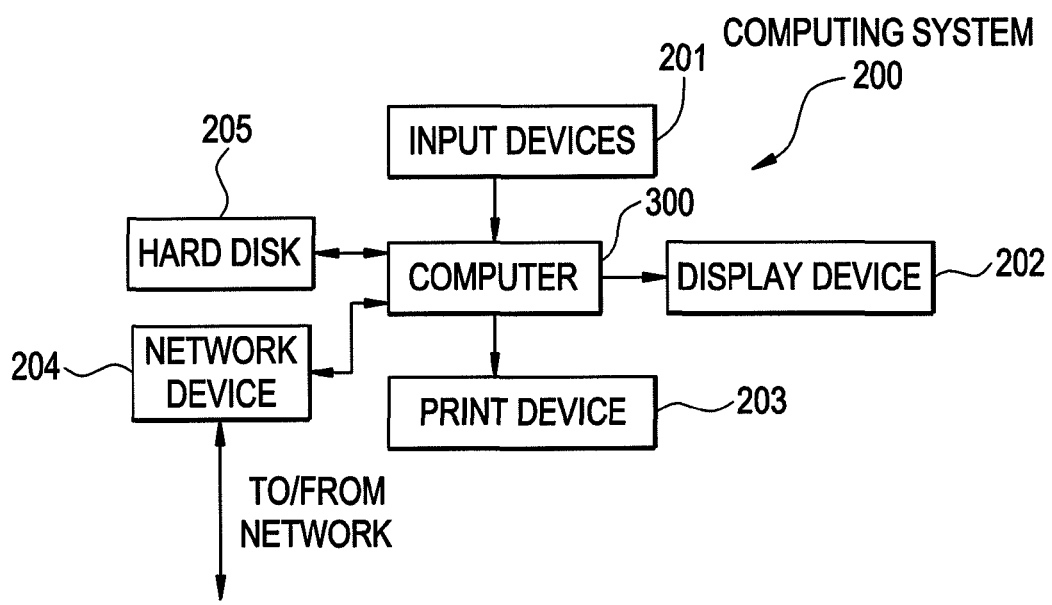
FIG. 2 is a block diagram of an embodiment of a computing system used in embodiments of the electronic negotiation engine and inventory management system shown in FIG. 1.

FIG. 2 is a diagram of a computing system 200 that can be used to implement the electronic negotiation engine 102 and also the Inventory Management System 101 depicted in FIG. 1. The computing system 200 includes a computer 300 connected to input devices 201 for handling input of information, a display device 202 for displaying information to a user, a print device 203 for printing information, a hard disk 205 for storing information and program instructions to be run on the computer 300 to implement the electronic negotiation engine 102 or Inventory Management System 101, and a network device 204 for communication to and from a network. Certain embodiments of the electronic negotiation engine and Inventory Management System may use only some of the components noted above. For example, some embodiments of an electronic negotiation engine and Inventory Management System do not have a display 202, a print device 203 or an input device 201 connected to the computer 300. Some embodiments also can use other types of data storage devices other than a hard disk 205, such as a semiconductor memory, etc. Alternatively, the Storage System 103 can be used in place of or in addition to the hard disk 205 for data and program storage. The computer system 200 shown in FIG. 2 can also be used for the dealer's computer 105 and the consumer's computer 106.

Figure 3:
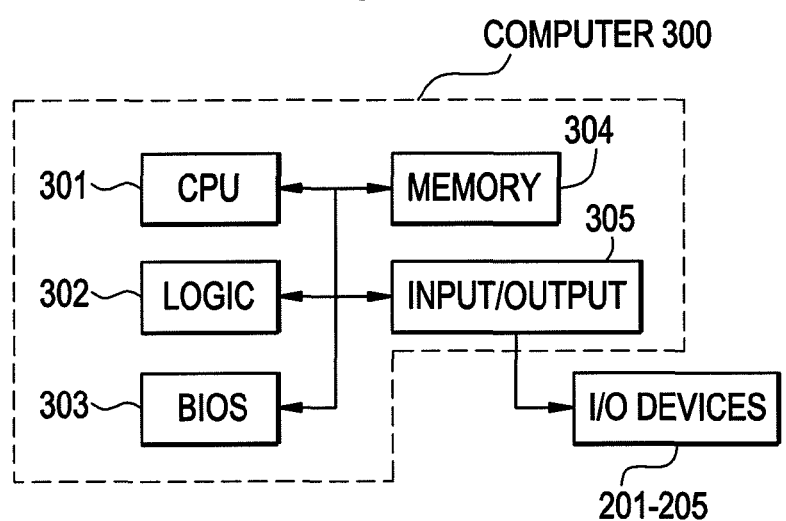
FIG. 3 is an expanded view of the computing system shown in FIG. 2.

FIG. 3 shows an expanded view of the computer 300 of FIG. 2, which has a CPU 301 for executing program instructions stored in a memory 304. FIG. 3 also shows logic 302 for performing programming logic required to allow interaction of the components of the computer 300, a BIOS 303 to provide basic program instructions and settings for the computer 300, and input/output facility 305 allowing control and communication with I/O devices 201-205. Certain embodiments of a computer used to implement the electronic negotiation engine and Inventory Management System may use only some of the components noted above.

Electronic Negotiation Engine

Figure 4:
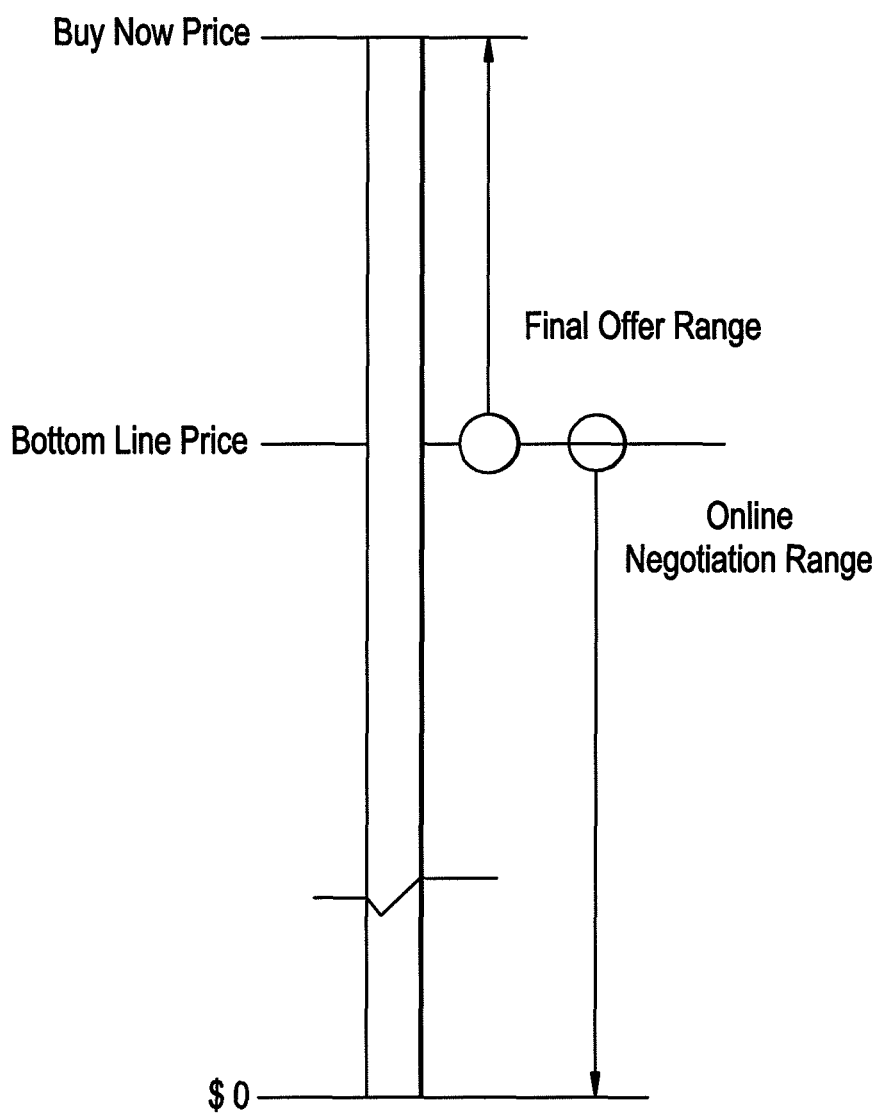
FIG. 4 depicts pricing components used by an embodiment of the electronic negotiation engine.

The electronic negotiation engine 102 uses pricing components tied to a specific piece of inventory to process an offer and determine the appropriate action to take. The pricing components are shown in a visual representation in FIG. 4 and are described as follows:

Buy Now Price—The Buy Now Price represents the amount a dealer is willing to sell a piece of inventory without online negotiating. This value does not necessarily need to be visible to consumers Bottom Line Price—The Bottom Line Price represents the lowest amount the dealer is willing to sell a piece of inventory. Any accepted offer or generated counter offer must be greater than or equal to the Bottom Line Price. The Bottom Line Price is never visible to the consumer.

Final Offer Range—The Final Offer Range is a range of values where the lower bound is equal to the Bottom Line Price and the upper bound is greater than the lower bound and less than or equal to the Buy Now Price. The Final Offer Range is used as the halt condition for the online negotiation process; if a Counter Offer falls within this range (inclusive of the boundaries in certain embodiments) the Counter Offer is considered the Final Offer and the online negotiation session with the consumer for the inventory item currently being negotiated is closed.

Online Negotiation Range—The Online Negotiation Range is a range of values where the lower bound is less than the Bottom Line Price and greater than $0 and the upper bound is the maximum possible value less than the Bottom Line Price, such that the range covers all values greater than or equal to the lower boundary but less than the Bottom Line Price. The lower bound can be set to a predetermined value or can be otherwise determined The Online Negotiation Range is used to determine when a consumer should receive a counter offer; if an offer falls within this range the electronic negotiation engine will generate a counter offer, if the offer falls outside this range a counter offer is not generated.

An Offer submitted for a specific piece of inventory either can be accepted (if the offer is greater than or equal to the Bottom Line Price), Rejected (if the offer is less than the Bottom Line Price and outside the Online Negotiation Range), or trigger a Counter Offer (if the Offer is less than the Bottom Line Price and within the Online Negotiation Range). The Counter Offer feature provides a mechanism to continue to engage consumers who make offers below the Bottom Line Price but within the Online Negotiation Range. The Counter Offer generated by the electronic negotiation engine must be greater than or equal to the Bottom Line Price. Additional rules for implementation could require that a Counter Offer must be less than any previous counter offer and greater than any previous offer, but such rules are not a requirement of every embodiment of the invention.

Process for Dealer

Figure 5:
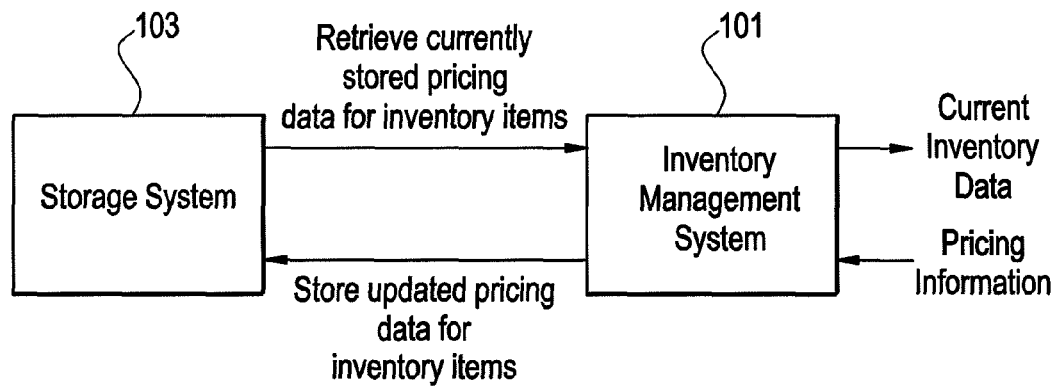
FIG. 5 is a diagram illustrating data elements that flow between the Storage System and the Inventory Management System of an embodiment of the online negotiation system.

As stated earlier, the electronic negotiation engine allows four pricing elements be set for each piece of inventory to enable online negotiation to take place for that piece of inventory. FIG. 5 shows details about data elements flowing between major components of the online negotiation system when a dealer interacts with the system. Referring to FIG. 5, a dealer, through the dealer's computer, can supply new or updated pricing information for inventory items to the Inventory Management System 101. The Inventory Management System 101 stores this pricing data for the inventory items in the Storage System 103. A dealer also can request from the Inventory Management System 101, by using the dealer's computer, data about the current inventory of products (e.g., automobiles). In response, the Inventory Management System 101 requests from the Storage System, and receives, pricing data for the requested inventory items. This data can be displayed or otherwise presented to the dealer by the dealer's computer.

One option for setting the pricing component data is to allow the dealer to enter each of the four pricing component values described above for each piece of inventory currently stored in the system. Additional options include using default pricing component values set by the dealer or a system administrator for all inventory items, allow the system to generate the pricing component values for each inventory item based on a configured formula, or a combination of these approaches. For certain embodiments, the rules of relationship between the pricing components are important but how the pricing components are set for each inventory item is not as important.

Process for the Consumer

Figure 6:
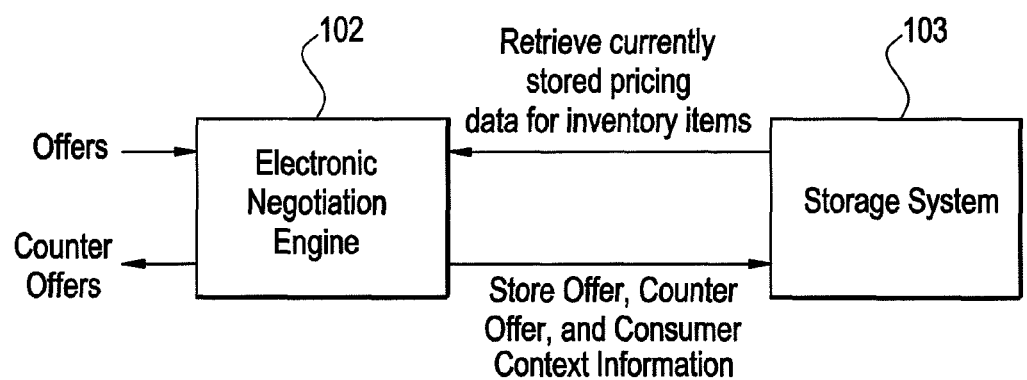
FIG. 6 is a diagram that illustrates data elements that flow between the Storage System and the electronic negotiation engine of an embodiment of the online negotiation system.

The consumer searches for and browses inventory to locate a piece of inventory s/he is interested in and then enters the online negotiation process for that piece of inventory. FIG. 6 shows details about data elements flowing between major components of the online negotiation system when a consumer interacts with the system. Referring to FIG. 6, a consumer, through the consumer's computer, can obtain information about an inventory item, such as an automobile. If the consumer desires to make an offer on the item, the consumer, through the consumer's computer, sends an offer for the item to the electronic negotiation engine 102. In response, the electronic negotiation engine sends the offer information to the Storage System 103 and receives from the Storage System 103 pricing data for the inventory item. This pricing data includes the pricing components described above. The electronic negotiation engine applies the pricing component values to the offer according to an algorithm to determine whether to accept or reject the offer, or to make a counter offer. The result of this determination is communicated to the consumer's computer. If the electronic negotiation engine determines that a counter offer should be made, the counter offer is transmitted to the consumer's computer. This data can be displayed or otherwise provided to the consumer by the consumer's computer. This counter offer is also stored in the Storage System 103. In certain embodiments context information about the consumer also is stored in the Storage System 103.

This online negotiation system provides a mechanism for the consumer to make offers for the item of inventory where an offer can be any value less than the Buy Now Price for the piece of inventory and greater than any previous offer by the consumer on this same item of inventory. The process continues until the consumer makes an offer equal to or greater than the Bottom Line Price or a Counter Offer generated by the system falls within the Final Offer Range.

Online Negotiation Process

Figure 7:
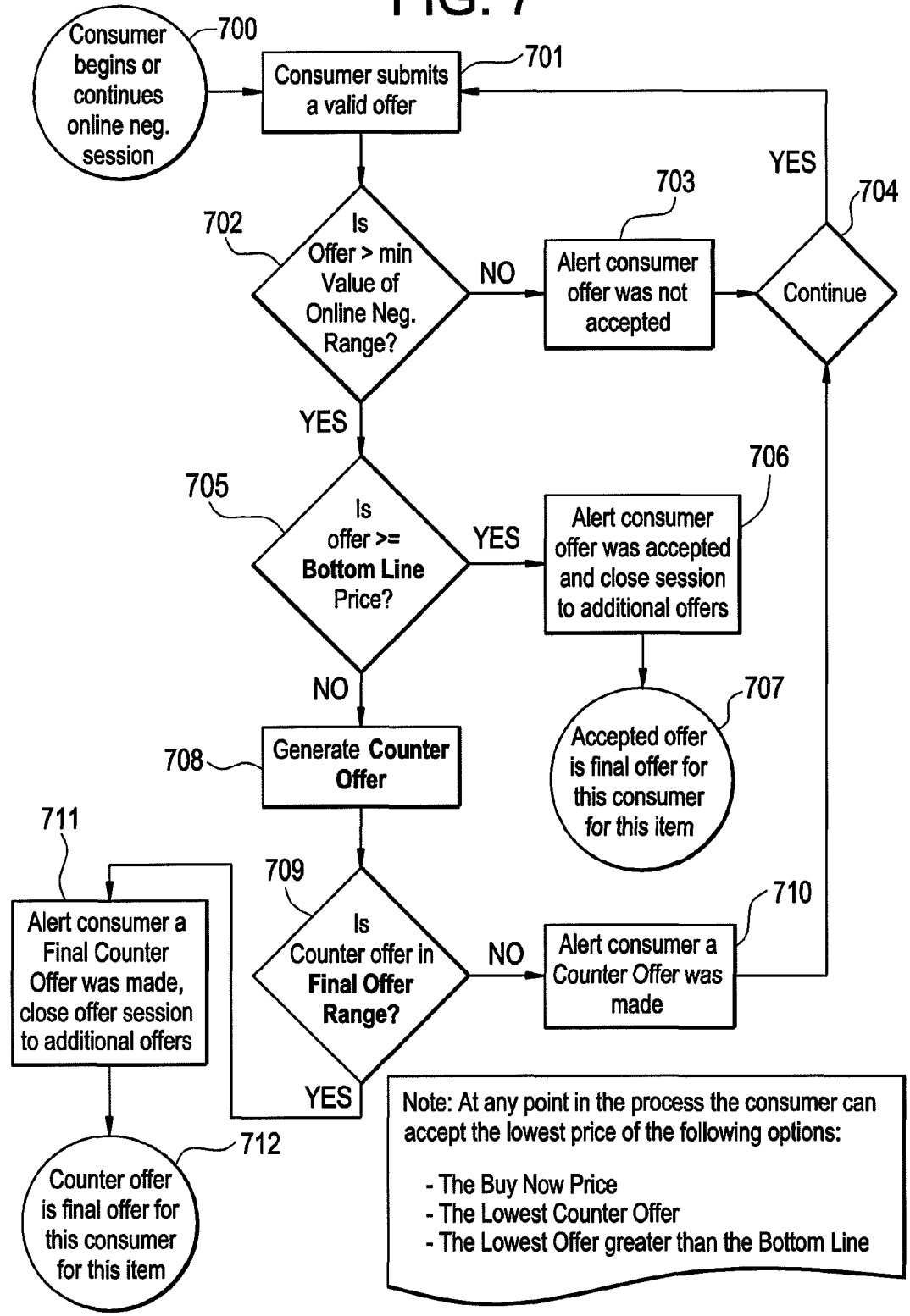
FIG. 7 is a flowchart illustrating a process used in an embodiment of an online negotiation system.

FIG. 7 is a flowchart illustrating a method for carrying out an online negotiation according to one embodiment of the invention. A consumer begins or continues an online negotiation session in step 700. Using the consumer's computer the consumer submits a valid offer for an item to the electronic negotiation engine in step 701. The electronic negotiation engine, in step 702, determines if the offer is greater than a minimum value of the Online Negotiation Range for the item. If not, the process goes to step 703 where the consumer is notified that the offer was not accepted. If the offer is greater than the minimum value for the Online Negotiation Range, the process flows to step 705 where it is determined whether the offer is greater than or equal to the Bottom Line Price for the item. If it is, then in step 706 the consumer is notified that the offer is accepted and the online negotiation session is closed to additional offers. In step 707 the accepted offer is deemed to be a final offer for the consumer for the item. If, in step 705 the offer is not accepted, the process flows to step 708 where the electronic negotiation engine generates a counter offer. In step 709 the electronic negotiation engine determines if the counter offer is in the Final Offer Range. If not, the consumer is notified in step 710 of the counter offer. The process flow then goes to step 704 where the online negotiation is continued and the consumer can accept the counter offer or make additional offers. However, in step 709, if the electronic negotiation engine determines that the counter offer is in the Final Offer Range, the counter offer is deemed a final counter offer. In step 711 the consumer is notified of the final counter offer and the session is closed to any additional offers. In step 712 the counter offer is set as the final offer for the consumer for the item.

At any point in the process shown in FIG. 7 the consumer can immediately accept the lowest price among several options. In one embodiment these options include the Buy Now Price, the Lowest Counter Offer, and the lowest Offer that is greater than the Bottom Line Price.

Example

An example of this process is described below along with an example of a calculation for determining the counter offer value. In this example a dealer defines the following price components for a piece of inventory, such as a vehicle.

Buy Now Price=$49,000
Bottom Line Price=$48,000
Final Offer Range Percent=10%
Online Negotiation Range Percent=4%

Figure 8:
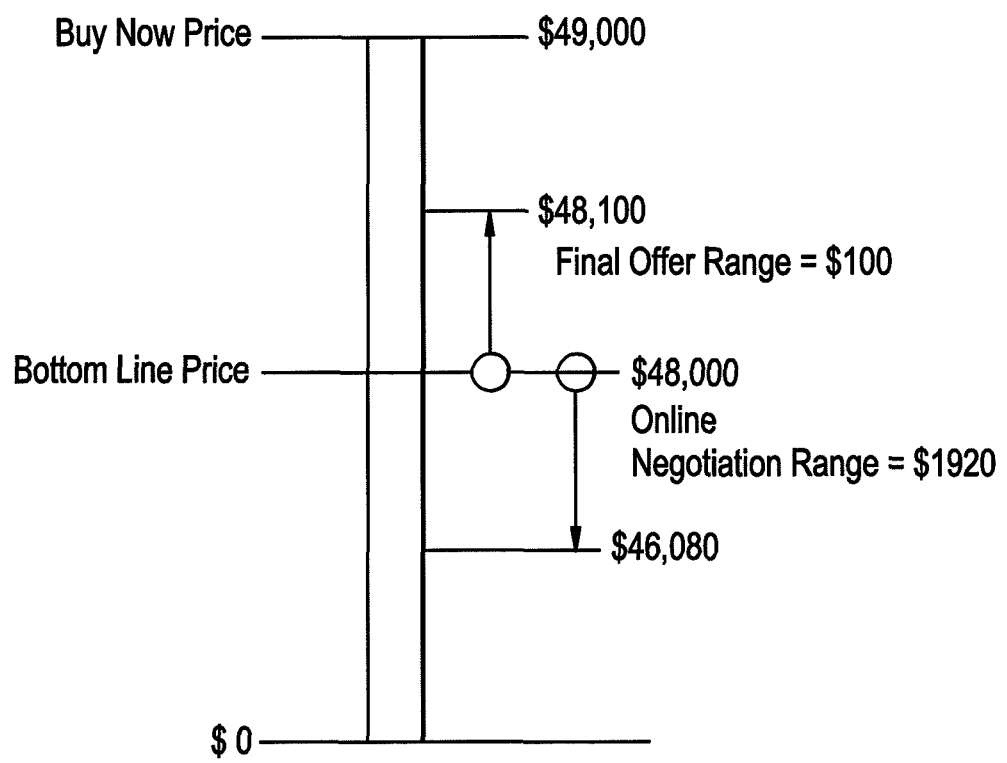
FIG. 8 depicts pricing components used in a specific example of the electronic negotiation engine.

These price components are shown visually in FIG. 8.

In this example, the Final Offer Range Percent defines the Final Offer Range as a percentage of the difference between the Bottom Line Price and the Buy Now Price, and the Online Negotiation Range Percent defines the Online Negotiation Range as a percentage of the Bottom Line Price. These ranges may also be defined by other information or values sufficient to clearly define the ranges, and need not necessarily be defined by percentages as in this example.

With these values, the calculated Online Negotiation Range extends from $46,080 to $48,000 (inclusive of the lower boundary). Accordingly, a consumer must make an offer within this range to receive a counter offer. The calculated Final Offer Range extends from $48,000 to $48,100, so any counter offer falling within this range (inclusive of the boundaries) will be the final offer, which if generated will close online negotiation for the inventory item in question.

The following sample online negotiation sessions, which use the above example pricing components, are examples to help illustrate the operation of an online negotiation session.

Sample Online Negotiation Session A

For this example session offer 1, shown in Table 1, is above the Bottom Line Price, so the offer is accepted and flagged as final so the session is complete.

TABLE 1

|         | Offer       | Accepted Offer |             |
|---------|-------------|----------------|-------------|
| offer 1 | $ 48,500.00 | $ 48,500.00    | Final Offer |

Sample Online Negotiation Session B

This session contains three successive offers as shown in Table 2. The first offer was less than the lower boundary of the Online Negotiation Range so no Counter Offer was made. The second offer was within the Online Negotiation Range so a Counter Offer was calculated and provided. The third offer was within the Online Negotiation Range so a Counter Offer was calculated and provided to the consumer. Additionally, the Counter Offer was within the Final Offer Range so the offer is flagged as final and the session is complete.

TABLE 2

|         | Offer       | Counter Offer   |             |
|---------|-------------|-----------------|-------------|
| offer 1 | $ 46,000.00 | No Counter offer |            |
| offer 2 | $ 47,000.00 | $ 48,520.83     |             |
| offer 3 | $ 47,900.00 | $ 48,052.08     | Final Offer |

Counter Offer Calculation

A sample of program code for calculating a counter offer is shown below in Table 3. Other calculations are possible, the only requirements in certain embodiments are that the counter offer must be greater than or equal to the Bottom Line Price, less than or equal to the Buy Now Price, and flagged as the final offer if the calculated value is within the Final Offer Range.

TABLE 3

```
// ensuer bid amount is in Online Negotiation range
if (bidAmount >= bottomline * (1 − erange))
{
    // if offer is >= bottom line then create and we are done.
    if (bidAmount >= bottomline)
    {
        isFinalOffer = true;
    }
    else // need to generate a counter offer
    {
        counterOffer = bottomline + ((buynow − bottomline) *
            ((bottomline − bidAmount) / (bottomline * erange)));
        // round down to nearest 10
        counterOffer −= counterOffer % 10;
        // double check we are not below bottomline after subtraction
```

TABLE 3-continued

```
        counterOffer = counterOffer < bottomline ? bottomline
            : counterOffer;
        // if the counter offer is in the final offer range then set
        // the final offer flag
        if (counterOffer <= (bottomline + ((buynow − bottomline) *
            frange))) isFinalOffer = true;
    }
}
```

A simplified version of the above calculation is also provided below in Eq. 1, as a further example of a method for calculating a counter offer, which uses the following variables:

BL—Bottom Line Price
BN—Buy Now Price
O—The offer made by the consumer
NR—The Online Negotiation Range percentage $$\text{Counter Offer} = BL + ((BN-BL)*((BL-O)/(BL*NR))) \quad \text{Eq. 1}$$

Other ways of determining a counter offer may be used. For example, the counter offer also can be based on a previously generated counter offer price, if desired.

Figure 9:
FIG. 9 is shows an example of a user interface for an online negotiation system before an online negotiation has started.

FIG. 9 and FIG. 10 show an exemplary embodiment of a user interface displayed on the consumer's computer that allows a consumer to interact with the electronic negotiation engine. FIG. 9 shows a view of the user interface 900 before online negotiation has started, and FIG. 10 shows a view of the user interface 900 after three offers and one counter offer have been made.

Referring to FIG. 9, the user interface 900 includes an eNegotiation Item Detail area 901 that contains information about the inventory item on which the consumer may make an offer. This area can include not only information about the inventory item, but also pricing information such as the Buy Now Price. The user interface 900 also has a Consumer Interaction Area 902. Prior to making an offer, as shown in FIG. 9, this area displays the Buy Now Price. It also includes a control "Lock-in" that the consumer can select to transmit a message to the electronic negotiation engine that conveys the consumer's acceptance of the Buy Now Price. After an offer has been made, the Consumer Interaction Area 902 can display other information, such as a dealer's counter offer automatically generated by the online negotiation system, as shown in FIG. 10. The user interface 900 also includes a Live Offer area 903 that contains a field in which the consumer can enter an offer price. By entering an offer price and selecting the Live Offer control, the user interface causes the consumer's computer to transmit the offer to the electronic negotiation engine. An offer history area 904 displays the previous offers the consumer has made for the item and counter offers received from the online negotiation system. In FIG. 10 the offer history area shows two previous offers the customer made which were too low to be accepted, and a counter offer made by the online negotiation system. The user interface can also include a help area 905 (shown in FIG. 9) which can display information to help the consumer use the online negotiation system and to display information about the terms and conditions for use of the online negotiation system.

It should be recognized by those of ordinary skill in the art that exemplary automated negotiations systems, methods and articles of manufacture are described here by way of an example only and not by way of a limitation. Various other configurations for an online negotiation system are possible. Methods of performing an online negotiation can be performed by executing software instructions stored on a computer readable medium by a computer processor. Such a computer readable medium can include a RAM, ROM, flash memory, magnetic media, optical media, etc.

The above and other features of the invention including various novel method operations and a system of the various modules have been particularly described with reference to the accompanying drawings and pointed out in the claims. It will be understood that the particular process and construction of parts embodying the invention are shown by way of illustration only and not as a limitation of the invention. The principles and features of this invention may be employed in varied and numerous embodiments without departing from the spirit and scope of the invention as defined by the appended claims and their equivalents.

What is claimed is:

1. A method for negotiating a sale of an item, comprising:
receiving over a computer network an offer to purchase the item;
automatically processing the offer in response to receiving the offer, the processing performed by a computer and comprising:
accepting the offer if the offer is greater than a bottom line price for the item;
rejecting the offer if the offer is below a negotiation range which extends below the bottom line price; and
if the offer is within the negotiation range for the item, automatically generating a counter offer price that is greater than or equal to the bottom line price, wherein the negotiation range extends from the bottom line price to a lower boundary of the negotiation range that is less than the bottom line price; and
accepting the offer if the offer equals a buy now price communicated to the buyer,
wherein the counter offer is calculated according to:

$$\text{Counter Offer} = BL + ((BN-BL)*((BL-O)/(BL*NR))),$$

where BL is the bottom line price, BN is the buy now price, O is the offer, and NR is the negotiation range.

2. The method of claim 1, wherein a final offer range has a lower bound equal to the bottom line price and an upper bound greater than the lower bound, and if the counter offer is in the final offer range, indicating that the counter offer is a final counter offer.

3. The method of claim 1, wherein the item is one of an automobile, a motorcycle and a watercraft.

4. The method of claim 1, further comprising receiving and storing in a computer readable memory:
information concerning the item;
the bottom line price for the item;
the buy now price for the item;
information indicating the negotiation range for the item; and
information indicating the final offer range for the item.

5. The method of claim 1, wherein the negotiation for the sale occurs during a negotiating session between a buyer and a seller of the item, and if a previously generated counter offer price was generated during the session, the computer generates a counter offer price that is closer to the offer than the previously generated counter offer price.

6. An apparatus facilitating a negotiation between a buyer and seller of an item, comprising:
an inventory management unit managing an inventory of items and information about the items including a bottom line price and a negotiation range for each item;
a negotiation unit coupled to the inventory management unit and a data communications network, the negotiation unit, in response to receiving an offer for an item managed by the inventory management unit, generates a counter offer if the offer is less than the bottom line price for the item and within the negotiation range for the item, and transmits the counter offer to the buyer; and
accepting the offer if the offer equals a buy now price communicated to the buyer,
wherein the counter offer is calculated by a computer according to:

$$\text{Counter Offer} = BL + ((BN-BL)*((BL-O)/(BL*NR))),$$

where BL is the bottom line price, BN is the buy now price, O is the offer, and NR is the negotiation range.

7. The apparatus of claim 6, wherein a final offer range has a lower bound equal to the bottom line price and an upper bound greater than the lower bound, and if the counter offer is in the final offer range, the negotiation unit notifies a buyer's computer that the counter offer is a final counter offer.

8. The apparatus of claim 6, wherein the item is one of an automobile, a motorcycle and a watercraft.

9. A non-transitory computer readable storage medium having recorded thereon program instructions that when executed by a computer processor perform a method for negotiating a sale of an item, comprising:
program instructions for receiving over a computer network an offer to purchase the item;
program instructions for automatically processing the offer in response to receiving the offer, the processing performed by a computer and comprising:
accepting the offer if the offer is greater than a bottom line price for the item;
rejecting the offer if the offer is below a negotiation range which extends below the bottom line price; and
if the offer is within the negotiation range for the item, automatically generating a counter offer price that is greater than or equal to the bottom line price, wherein the negotiation range extends from the bottom line price to a lower boundary of the negotiation range that is less than the bottom line price; and
program instructions for accepting the offer if the offer equals a buy now price communicated to the buyer,
wherein the counter offer is calculated according to:

$$\text{Counter Offer} = BL + ((BN-BL)*((BL-O)/(BL*NR))),$$

where BL is the bottom line price, BN is the buy now price, O is the offer, and NR is the negotiation range.

10. The computer readable storage medium of claim 9, wherein a final offer range has a lower bound equal to the bottom line price and an upper bound greater than the lower bound, and if the counter offer is in the final offer range, indicating that the counter offer is a final counter offer.

* * * * *